(12) United States Patent
Jafari Tafti et al.

(10) Patent No.: US 12,179,756 B2
(45) Date of Patent: Dec. 31, 2024

(54) ALGORITHM TO GENERATE PLANNING-BASED ATTENTION SIGNALS

(71) Applicant: GM Global Technology Operations LLC, Detroit, MI (US)

(72) Inventors: Sayyed Rouhollah Jafari Tafti, Troy, MI (US); Brent Navin Roger Bacchus, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 17/935,637

(22) Filed: Sep. 27, 2022

(65) Prior Publication Data
US 2024/0101107 A1   Mar. 28, 2024

(51) Int. Cl.
*B60W 30/095* (2012.01)
*B60W 60/00* (2020.01)

(52) U.S. Cl.
CPC .... *B60W 30/0956* (2013.01); *B60W 60/0011* (2020.02); *B60W 2400/00* (2013.01)

(58) Field of Classification Search
CPC ......... B60W 30/0956; B60W 30/0011; B60W 2400/00
See application file for complete search history.

(56) References Cited

U.S. PATENT DOCUMENTS

2019/0291728 A1*  9/2019  Shalev-Shwartz ............................ B60W 50/0097
2023/0054974 A1*  2/2023  Baig .................... B60W 40/04

* cited by examiner

Primary Examiner — Adnan M Mirza
(74) Attorney, Agent, or Firm — Vivacqua Crane, PLLC

(57) ABSTRACT

A method generating planning-based attention signals includes receiving driving-scene data. The driving-scene data is indicative of a driving scene around a host vehicle. The driving-scene data includes map data and localization data. The driving scene includes a plurality of actors. The method further includes converting the driving-scene data into a scene-graph. The method further includes inputting the scene-graph into a deep neural network (DNN). Further, the method includes determining an attention score for each of the plurality of actors using the DNN and the scene-graph. The attention score of each of the plurality of actors represents a priority given to each of the plurality of actors in the driving scene. The method further includes commanding the host vehicle to autonomously drive according to a trajectory determined by taking into account the attention score of each of the plurality of actors.

11 Claims, 5 Drawing Sheets

ALGORITHM TO GENERATE PLANNING-BASED ATTENTION SIGNALS

INTRODUCTION

The present disclosure relates to autonomous vehicles and, more particularly, to systems and methods for generating planning-based attention signals.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

During autonomous driving, most the processed sensor data are not used by the downstream planning algorithm because the sensor data are not relevant for the current driving scenario. The unused sensor data, however, makes the host vehicle computationally inefficient. Therefore, it is desirable to develop a system that uses previously unused sensor data to generate attention signals based on a planning-based sensitivity analysis.

SUMMARY

The present disclosure describes a method generating planning-based attention signals. In an aspect of the present disclosure, the method includes receiving driving-scene data. The driving-scene data is indicative of a driving scene around a host vehicle. The driving-scene data includes sensor data, map data, and localization data. The driving scene includes a plurality of actors. The method further includes converting the driving-scene data into a scene-graph. The method further includes inputting the scene-graph into a deep neural network (DNN). Further, the method includes determining an attention score for each of the plurality of actors using the DNN and the scene-graph. The attention score of each of the plurality of actors represents a priority given to each of the plurality of actors in the driving scene. The method further includes commanding the host vehicle to autonomously drive according to a trajectory determined by taking into account the attention score of each of the plurality of actors. The method described in this paragraph improves autonomous driving technology by generating attention signals, which provides a more comprehensive view of the driving scene.

In an aspect of the present disclosure, one of the plurality of actors is a lead remote-vehicle. The method may further include determining that the attention score of the lead remote-vehicle is zero, determining a time-to-collision (TTC) of the lead remote-vehicle to the host vehicle, and adding a predetermined value to the attention score of the lead remote-vehicle. The predetermined value is proportional to the TTC.

In an aspect of the present disclosure, the plurality of actors includes a plurality of irrelevant actors. The irrelevant actors are the ones that are undetected by a plurality of sensors of the host vehicle in real-world or that cannot affect the autonomous driving plan for the host vehicle. The method further includes filtering out the plurality of irrelevant actors before determining the attention score for each of the plurality of actors.

In an aspect of the present disclosure, the method further includes creating a plurality of scenarios by generating sufficient samples from an uncertainty distribution of a state of the plurality of actors.

In an aspect of the present disclosure, the method further includes generating a sample trajectory for each of the plurality of scenarios.

In an aspect of the present disclosure, the method further includes computing a trajectory statistic using the sample trajectory for each of the plurality of scenarios.

In an aspect of the present disclosure, the method further includes removing an actor of the plurality of actors from the driving scene. The actor of the plurality of actors that was removed from the driving scene is a removed actor. The plurality of actors includes the removed actor and a plurality of remaining actors. The plurality of scenarios is a plurality of first scenarios. The method further includes creating a plurality of second scenarios by generating sufficient samples from an uncertainty distribution of a state of the plurality of remaining actors.

In an aspect of the present disclosure, the trajectory statistic is a first trajectory statistic. The method further includes computing a second trajectory statistic using the sample trajectory for each of the plurality of second scenarios.

In an aspect of the present disclosure, the method further includes determining a distance from the first trajectory statistic to the second trajectory statistic.

In an aspect of the present disclosure, the first trajectory statistic is a first average trajectory. The second trajectory statistic is a second average trajectory. The distance from the first trajectory statistic to the second trajectory statistic is determined using a following equation:

$$D_i = \max_t \left[ (x_i(t) - x_0(t))^2 + (y_i(t) - y_0(t))^2 \right]$$

where:
- t is time;
- ($x_o$(t), $y_o$(t)) are waypoints at time t of the first average trajectory;
- ($x_i$(t), $y_i$(t)) are waypoints at time t of second average trajectory; and
- $D_i$ is distance from the first average trajectory to the second average trajectory.

In an aspect of the present disclosure, the method further includes determining whether the distance from the first trajectory statistic to the second trajectory statistic is less than a predetermined threshold. The method further includes setting the attention score of the removed actor to zero in response to determining that the distance from the first trajectory statistic to the second trajectory statistic is less than the predetermined threshold.

In an aspect of the present disclosure, the method further includes determining whether the distance between the first trajectory statistic and the second trajectory statistic is less than a predetermined threshold. The method further includes setting the attention score of the removed actor to a value between zero and one in response to determining that the distance from the first trajectory statistic to the second trajectory statistic is not less than the predetermined threshold. The attention score of the removed actor is proportional to the distance between the first trajectory statistic and the second trajectory statistic.

In an aspect of the present disclosure, the method further includes assigning a plurality of priority scores for each of a plurality of regions around the host vehicle using the attention score of each of the plurality of actors.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
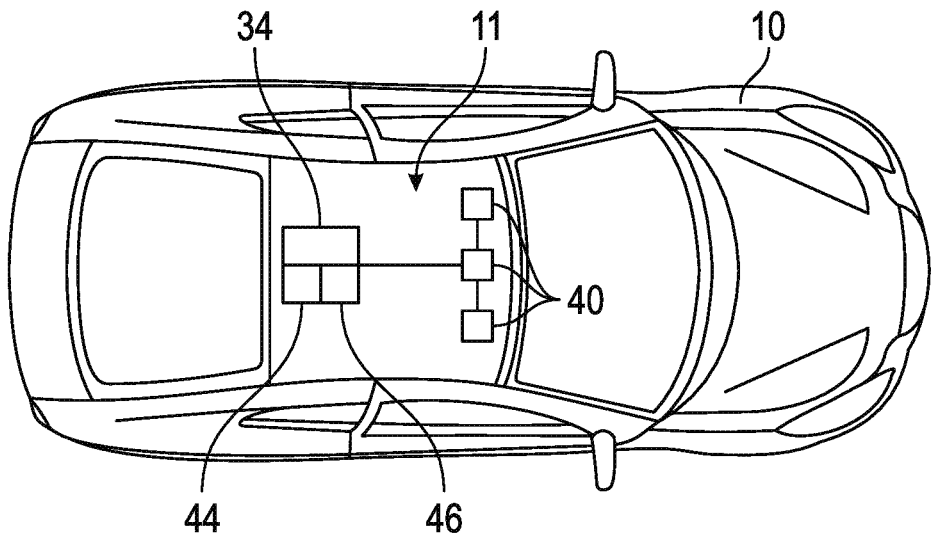
FIG. 1 is a schematic diagram of a host vehicle including a system for generating planning-based attention signals.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 includes (or is in communication with) a system 11 for generating planning-based attention signals. While the system 11 is shown inside the host vehicle 10, it is contemplated that the system 11 may be outside of the host vehicle 10. As a non-limiting example, the system 11 may be a cloud-based system in wireless communication with the host vehicle 10. Although the host vehicle 10 is shown as a sedan, it is envisioned that that host vehicle 10 may be another type of vehicle, such as a pickup truck, a coupe, a sport utility vehicle (SUVs), a recreational vehicle (RVs), etc. Irrespective of the type of vehicle, the host vehicle 10 is an autonomous vehicle configured to drive autonomously.

The system 11 includes a system controller 34 and one or more sensors 40 in communication with the system controller 34. The sensors 40 collect information and generate sensor data indicative of the collected information. As non-limiting examples, the sensors 40 may include Global Positioning System (GPS) transceivers, yaw sensors, speed sensors, lidars, radars, and cameras, among others. The GPS transceivers are configured to detect the location of the host vehicle 10. The speed sensors are configured to detect the speed of the host vehicle 10. The yaw sensors are configured to determine the heading of the host vehicle 10. The cameras have a field of view large enough to capture images of the roadways 62 (FIG. 2) in front and rear of the host vehicle 10. For example, the cameras are configured to capture images of one or more actors 50, such as remote vehicles, around the host vehicle 10.

The system controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the system controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media of the system controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the system controller 34 in controlling the host vehicle 10. The non-transitory computer readable storage device or media 46 may store map data and/or sensor data received from one of the sensors 40. The sensor data may include localization data received from the GPS transceiver.

The instructions may include one or more separate programs, each of which comprises an ordered listing of executable instructions for implementing logical functions. The instructions, when executed by the processor 44, receive and process signals from the sensors 40, perform logic, calculations, methods and/or algorithms for automatically controlling the components of the host vehicle 10, and generate control signals to the actuators to automatically control the components of the host vehicle 10 based on the logic, calculations, methods, and/or algorithms. Although a single system controller 34 is shown in FIG. 1, the system 11 may include a plurality of system controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the system controller 34 are embodied in the system 11. The non-transitory computer readable storage device or media 46 includes machine-readable instructions (shown, for example, in FIG. 6), that when executed by the one or more processors, cause the processors 44 to execute the method 100 (FIG. 4), the method 200 (FIG. 5), and the method 300 (FIG. 7).

As discussed in detail below, the system 11 is configured to generate attention signals based on a supervised learning approach. In particular, the system 11 determines attention scores based on the sensitivity of the planned trajectory of the actors 50, such as remote vehicles. The attention scores are used as feedback from the planning algorithm to the perception and localization algorithms. The perception algorithms and the localization algorithm processed the sensor data (i.e., the sensing inputs from the sensors 40) to accurately perceive the environment around the host vehicle 10 within the sensing horizon (i.e., sensors range).

In other vehicle systems, most the processed sensor data are not used by the downstream planning algorithm because the sensor data are not relevant for the current driving scenario 70. The unused sensor data, however, makes the host vehicle 10 computationally inefficient. Further, the unused sensor data may also be utilized to enhance actor detection and localization accuracy. The system 11 uses previously unused sensor data to generate attention signals based on a planning-based sensitivity analysis. The attention signals may be in the form of attention scores for each actor and/or region in the driving scene 70. In addition, the system 11 employs an automated data labeling procedure to generate training data sets. A graph 72 (FIG. 3) representing the driving scene 70 (FIG. 2) is used to generalize the method 100 for different road scenarios.

Figure 2:
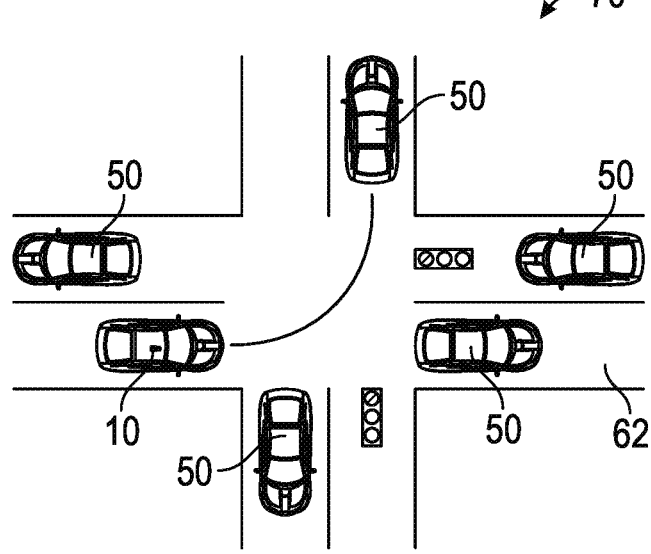
FIG. 2 is a schematic top view of a driving scene of the host vehicle of FIG. 1.
Figure 3:
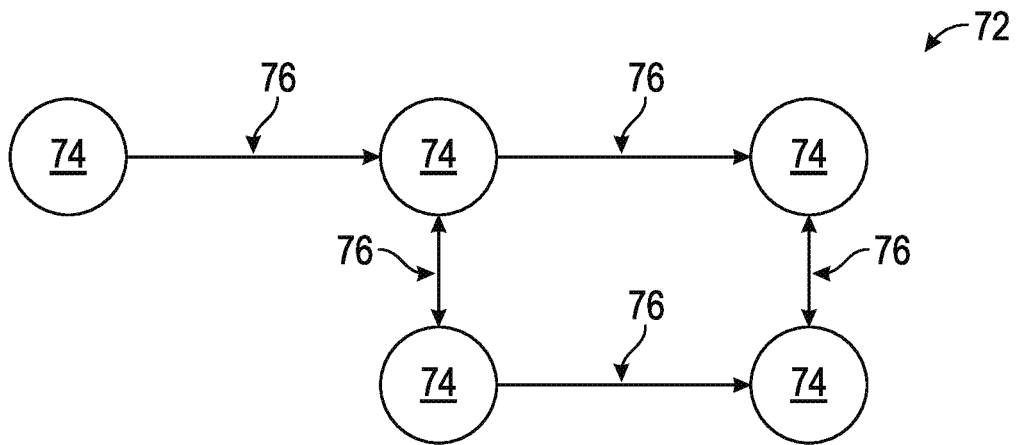
FIG. 3 is a scene-graph indicative of the driving scene of FIG. 2.

With reference to FIGS. 2 and 3, during autonomous driving, the host vehicle 10 may be driving on a current driving scene 70 as shown in FIG. 2. In the present disclosure, the term "driving scene" means the environment around the host vehicle 10 and includes the static and dynamic actors 50 around the host vehicle 10 (e.g., 20 feet around the host vehicle 10). The actors 50 around the host vehicle 10 may include, but are not limited to, remote vehicles in the roadway 62. The sensors 20, such as cameras and lidars, may detect the current driving scene 70 and send the driving-scene data, which is indicative of the current driving scene 70, to the system controller 34. As discussed below, the system controller 34 converts the driving-scene data into a scene-graph 72 (FIG. 3). In the scene-graph 72 (FIG. 3), the nodes 74 represent road's lane segments with attributes such as the lengths of the lane segments, the positions of the remote vehicles 50, the position of the signs, etc. The edges 76 between the nodes 74 represent, among other things, connectivity type between lane segments such as adjacent, merge, split, etc.

Figure 4:
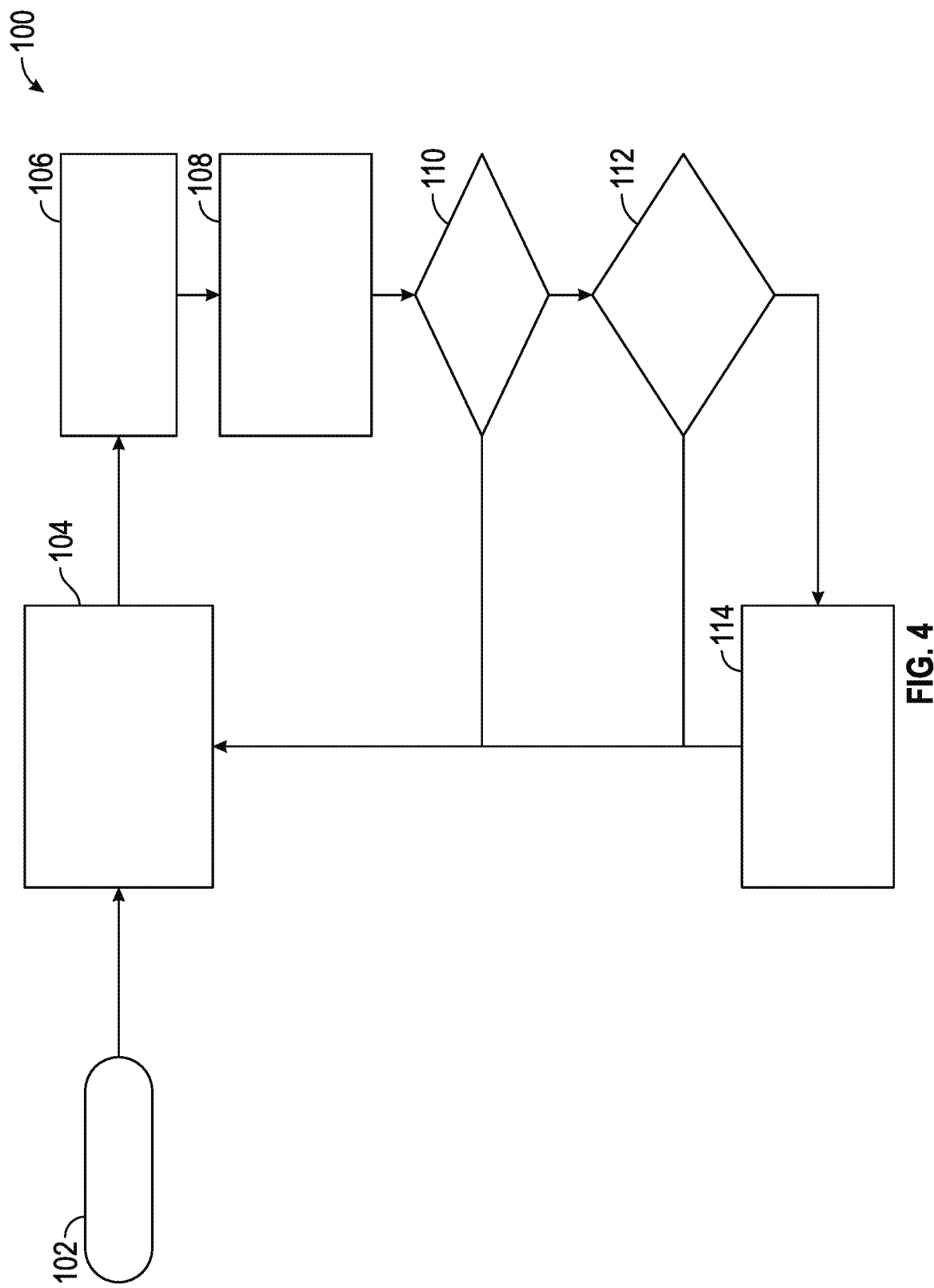
FIG. 4 is a flowchart of a method for generating planning-based attention signals.

FIG. 4 is a flowchart of a method 100 for generating planning-based attention signals. The method 100 begins at block 102. Then, the method 100 continues to block 104. At block 104, the system controller 34 receives driving-scene data, which may be referred to as input data. The driving-scene data is indicative of the driving scene 70 around the host vehicle 10 and includes map data, route data, perception data (i.e., sensor data), localization data, and prediction data. Map data includes a map of the driving scene 70. Localization data includes a location of the host vehicle 10 in the map. As discussed above, the driving scene 70 includes one or more actors 50. In this method 100, it is assumed that there is uncertainty associated with each actor's state. The driving-scene data may be obtained from real-world driving logs. In this case, the driving-scene data includes sensor data from the sensors 40 and map data stored on the non-transitory computer readable storage device or media 46. The sensor data may include localization data received from the GPS transceiver, which may be deemed one of the sensors 40. Alternatively, the driving-scene data may be simulated scenarios randomly selected from a wide range of driving scenes with different road geometries and traffic configurations. Then, the method 100 continues to block 106.

At block 106, the system controller 34 converts the driving-scene data into the scene-graph. In the scene-graph 72 (FIG. 3), the nodes 74 represent, among other things, the lengths of the line segments, the positions of the actors 50 (e.g., remote vehicles), the position of the signs, etc. The edges 76 of the nodes 74 represent, among other things, connectivity with attributes, such as a connection type (e.g., adjacent, merge, split, etc.). Next, the method 100 continues to block 108.

At block 108, the system controller 34 feeds the scene-graph 72 into a deep neural network (DNN) to find attention scores for actors 50 (FIG. 2). Therefore, at block 108, the DNN determines the attention scores for each actor 50 in the driving scene 70 using the scene-graph 72. Each of the attention scores represents a priority given to each of the actors 50 based on the driving scene. The method 100 also includes optional blocks 110, 112, and 114 for adjusting attentions scores. However, regardless of whether optional blocks 110, 112, and 114 are executed, the system controller 34, either at block 108 or block 114, commands the host vehicle 10 to autonomously drive according to a trajectory determined by taking into account the attention scores. After block 108, the method 100 may continue to block 110.

At block 110, the system controller 34 determines whether one of the actors 50 in the driving scene 70 is a lead remote-vehicle. In the present disclosure, the term "lead remote-vehicle" means a remote vehicle that is directly in front of the host vehicle 10 and is in the same lane as the host vehicle 10 within a predetermined distance from it. Therefore, no other remote vehicle is between the lead remote-vehicle and the host vehicle 10. If there is no lead-remote vehicle, then the method 100 returns to block 104. However, if there is a lead remote-vehicle, then the method 100 continues to block 112. At block 112, the system controller 34 determines whether the attention score assigned to the lead remote-vehicle at block 108 is zero. If the attention score of the lead remote-vehicle is not zero, then the method 100 returns to block 104. However, if the attention score of the lead remote-vehicle is zero, then the method 100 proceeds to block 114.

At block 114, the system controller 34 determines a time-to-collision (TTC) of the lead remote-vehicle to the host vehicle 10 using, for example, the sensor data from the sensors 40. In the present disclosure, the term "TTC" means the time that remains until a collision between two vehicles would have occurred if the collision course and speed difference are maintained. Then, the system controller 34 adds a predetermined value to the attention score of the lead remote-vehicle based on TTC. The predetermined value added to the attention score of the lead remote-vehicle is indirectly proportional to the TTC of the lead remote-vehicle to the host vehicle 10. Thus, the higher the TTC of the lead remote-vehicle to the host vehicle 10, the lower the predetermined value added will be. Then, the method 100 returns to block 104.

Figure 5:
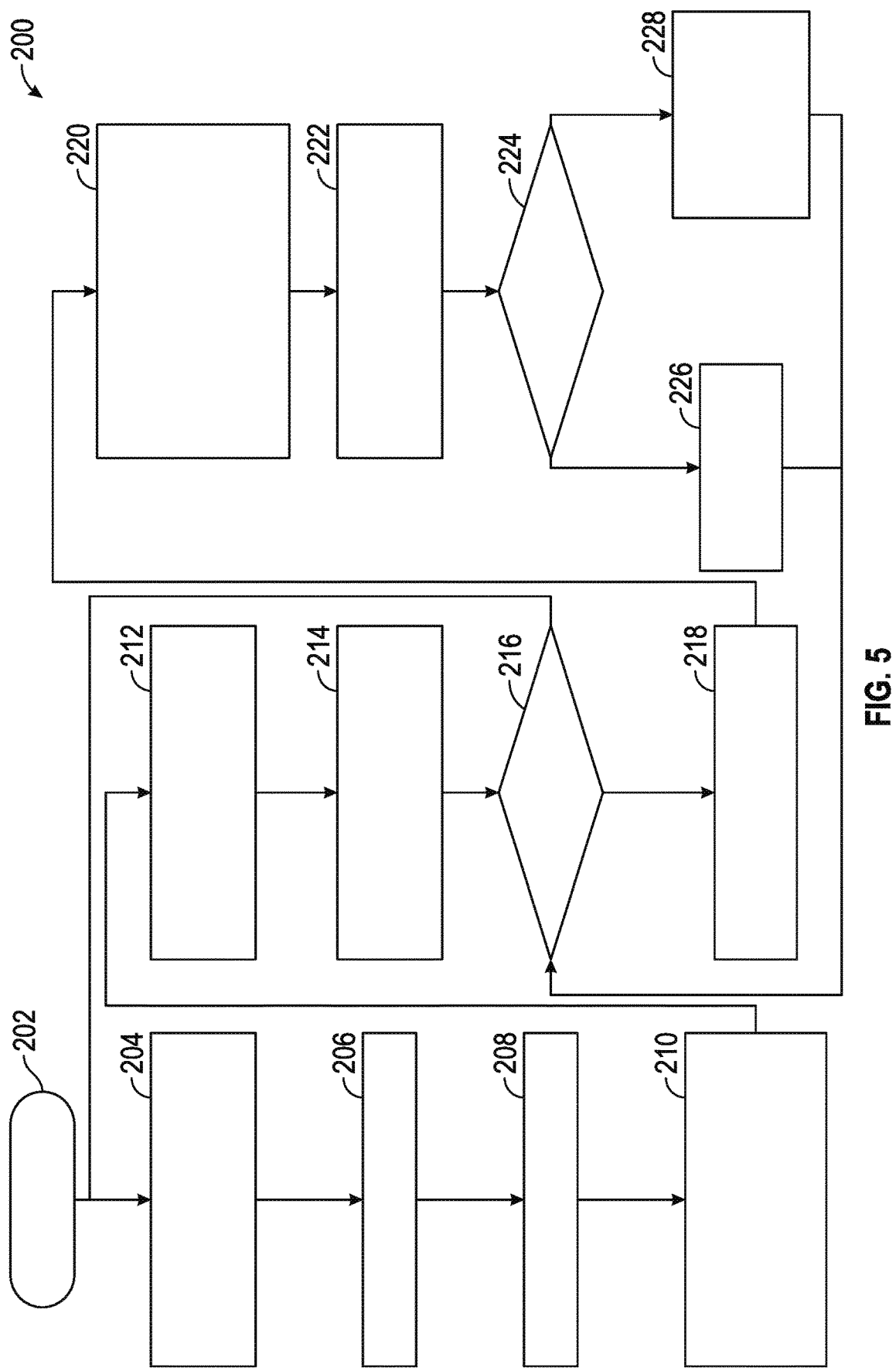
FIG. 5 is a flowchart of a method for generating attention scores for each actor.

FIG. 5 is a flowchart of a method 200 for generating attention scores for each actor 50 which is used to label data set for training DNN at block 108 in FIG. 4. The method 200 begins at block 202. Then, the method 200 continues to block 204. At block 204, the system controller 34 receives driving-scene data, which may be referred to as input data. The driving-scene data is indicative of the driving scene 70 around the host vehicle 10 and includes map data, route data, perception data (i.e., sensor data), localization data, and prediction data. As discussed above, the driving scene 70 includes one or more actors 50. In this method 200, it is assumed that there is uncertainty associated with each actor's state. The driving-scene data may be obtained from real-world driving logs. In this case, the driving-scene data includes sensor data from the sensors 40 and map data stored on the non-transitory computer readable storage device or media 46. The sensor data may include localization data received from the GPS transceiver, which may be deemed one of the sensors 40. Alternatively, the driving-scene data may be simulated scenarios randomly selected from a wide range of driving scenes with different road geometries and traffic configurations. Then, the method 200 continues to block 206.

At block 206, the system controller 34 converts the driving-scene data into the scene-graph. In the scene-graph 72 (FIG. 3), the nodes 74 represent road's lane segments with attributes such as the lengths of the lane segments, the positions of the remote vehicles 50, the position of the signs, etc. The edges 76 between the nodes 74 represent, among other things, connectivity type between lane segments such as adjacent, merge, split, etc. Next, the method 200 continues to block 208.

Block 208 is optional. At block 208, the system controller 34 filters out irrelevant actors 50. In the present disclosure, the term "irrelevant actor" means an actor that cannot be detected by sensors 40 in the real-world or that cannot affect the autonomous driving plan for the host vehicle 10. For example, the irrelevant actors 50 include, but are not limited to: (a) actors 50 that are beyond the sensor maximum range (i.e., the sensor horizon) of one or more sensors 40 and, therefore, cannot be detected; (b) actors 50 that are occluded from the sensors 40 due to static or dynamic obstacles and, therefore, cannot be detected; and (c) actors 50 that are in front of the lead remote-vehicle relative to the host vehicle 10 or behind a remote vehicle that directly in the rear of the host vehicle 10. Then, the method 100 proceeds to block 210.

At block 210, the system controller 34 creates new scenarios by generating sufficient samples from actors' state uncertainty distribution. In present disclosure, the "state" of the actor 50 (e.g., remote vehicle) means the motion, velocity, pose, orientation, behavior, and trajectory of the actor 50. Then, the method 200 continues to block 212.

At block 212, the system controller 34 runs an autonomous driving planning algorithm to generate a sample trajectory for each of the new scenarios created at block 210. The new scenarios generated at block 210 may be referred to as the first scenarios. Then, the method 200 proceeds to block 214.

At block 214, the system controller 34 determines (e.g., computes) a trajectory statistic using the sample trajectories for each of the new scenarios created at block 210. This trajectory statistics may be referred to as the first trajectory statistic. As a non-limiting example, the trajectory statistic may be an average trajectory that represents all sample trajectories. The average trajectory may be calculated, for example, using different statistical mean formulas, such as the arithmetic mean, the geometric mean, the harmonic mean, etc. Thus, the trajectory statistic determined at block 214 may be, for example, the arithmetic mean, the geometric mean, the harmonic mean of all the samples trajectory determined at block 212. The average trajectory determined at block 214 may be referred to as the first average trajectory. Next, the method 200 continues to block 216.

At block 216, the system controller 34 determines whether there are any unprocessed actors 50. As discussed below, unprocessed actors 50 are actors 50 that have not been removed in block 218. If there are no unprocessed actors 50, the method 200 returns to block 204. However, if there are unprocessed actors 50, the method 200 continues to block 218.

At block 218, for each actor 50, the system controller 34 removes one of the actors 50 from the driving scene 70 (FIG. 2). In the present disclosure, all the actors 50 include the removed actor 50 and all the remaining actors 50. The removed actor 50 is the actor 50 that was removed from the driving scene 70 at block 218. Then, the method 200 continues to block 220.

At block 220, the system controller 34 creates new scenarios (with the actor 50 removed) by generating sufficient samples from remaining actors' state uncertainty distribution. These new scenarios may be referred to as the second scenarios and do not include or consider the actor 50 removed at block 218. Also, at block 220, the system controller 34 runs an autonomous driving planning algorithm to generate a sample trajectory for each of the new scenarios created at block 220. The new scenarios generated at block 210 may be referred to as the second scenarios. Also, at block 220, the system controller 34 determines (e.g., computes) a trajectory statistic using the sample trajectories for each of the new scenarios created at block 220. This trajectory statistics may be referred to as the second trajectory statistic. As a non-limiting example, this trajectory statistic may be an average trajectory that represents all sample trajectories. The average trajectory may be calculated, for example, using different statistical mean formulas, such as the arithmetic mean, the geometric mean, the harmonic mean, etc. Thus, the trajectory statistic determined at block 220 may be, for example, the arithmetic mean, the geometric mean, the harmonic mean of all the samples trajectory determined at block 220. Next, the method 200 continues to block 222.

At block 222, the system controller 34 determines (e.g., computes) a distance $D_i$ (FIG. 6) from the first trajectory statistic determined at block 214 to the second trajectory statistic determined at block 220. To do so, the system controller 34 may use the following equation:

$$D_i = \max_t \left[ (x_i(t) - x_o(t))^2 + (y_i(t) - y_0(t))^2 \right]$$

where:
t is time;
$(x_o(t), y_o(t))$ are waypoints at time t of the first average trajectory determined at block 214;
$(x_i(t), y_i(t))$ are waypoints at time t of second average trajectory determined at block 220;
$x_o(t)$ represents a longitude of first average trajectory determined at block 214 at time t;
$x_i(t)$ represents a longitude of second average trajectory determined at block 214 at time t;
$y_o(t)$ represents a latitude of first average trajectory determined at block 214 at time t;
$y_i(t)$ represents a latitude of second average trajectory determined at block 214 at time t; and
$D_i$ is distance from the first average trajectory 230 (FIG. 6) determined at block 214 to the second average trajectory 232 (FIG. 6) determined at block 220.

Figure 6:
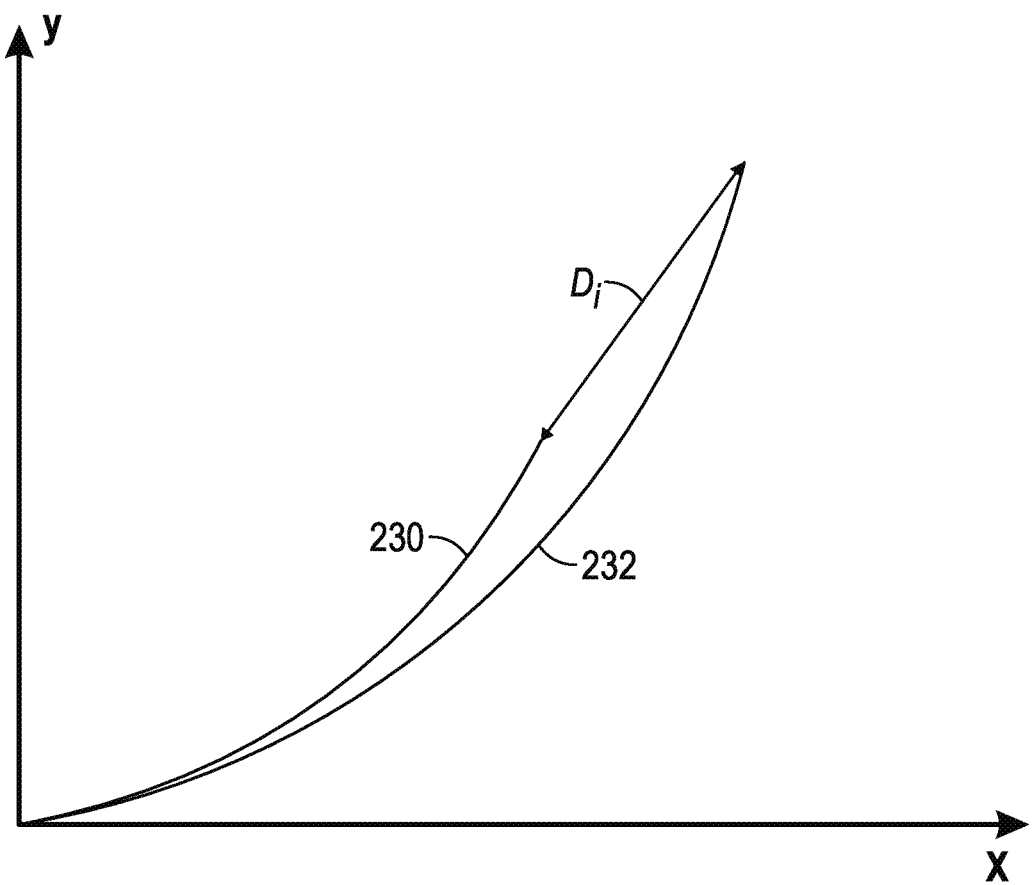
FIG. 6 is a graph illustrating a distance between trajectory statistics.
Figure 7:
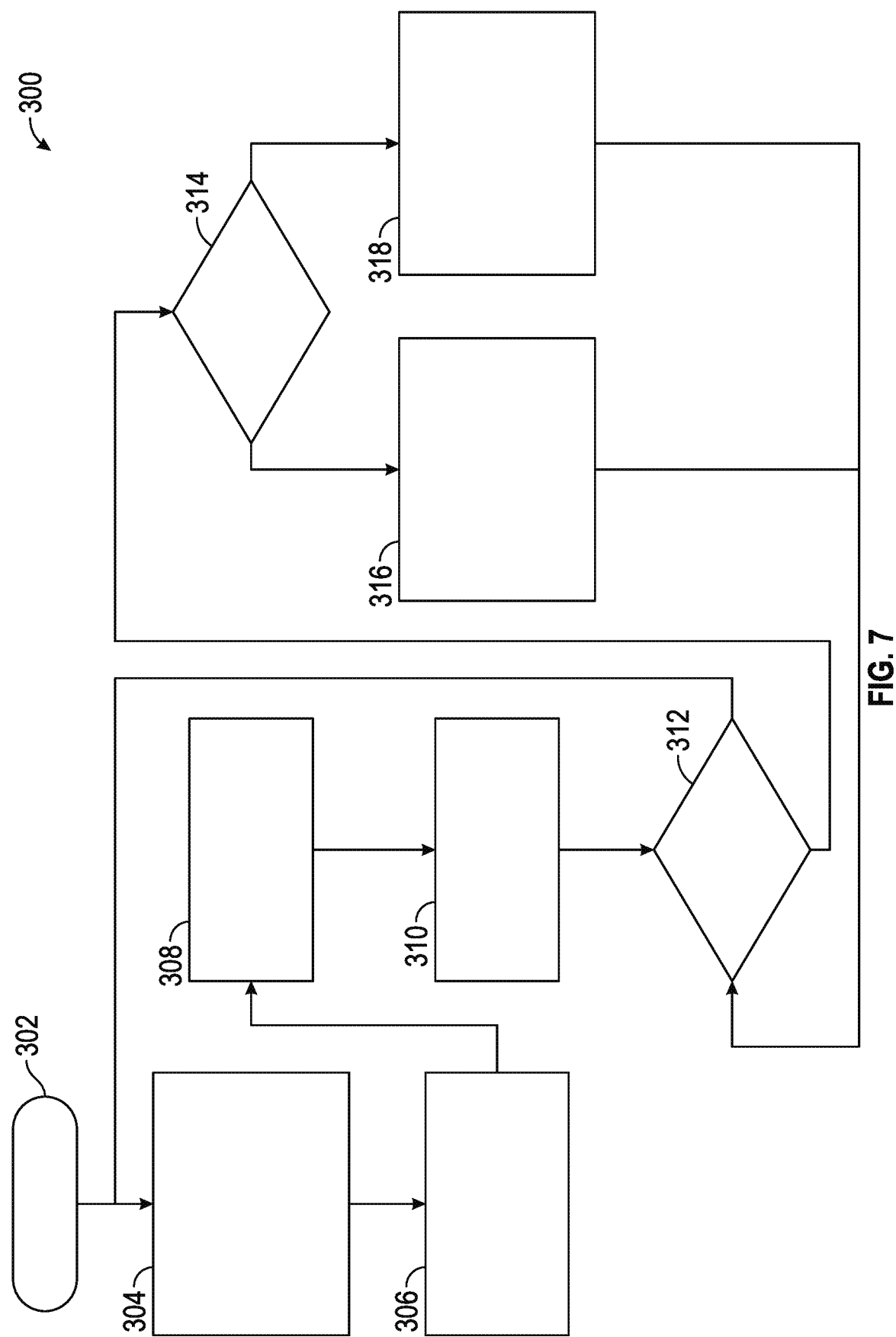
FIG. 7 is a flowchart of a method for generating region priority scores.

FIG. 6 is a graph illustrating the distance first average trajectory 230 determined at block 214 and the second average trajectory 232 determined at block 220 and illustrates the distance $D_i$ from the first trajectory statistic 230 determined at block 214 to the second average trajectory 232 determined at block 220. In the graph of FIG. 6, the horizontal x axis represents a longitude of a trajectory of the host vehicle 10, and the vertical y-axis represents a latitude of a trajectory of the host vehicle 10. After block 222, the system controller 34 may proceeds to block 224.

At block 224, the system controller 34 determines whether the distance $D_i$ from the first trajectory statistic to the second trajectory statistic is less than a predetermined threshold. The predetermined threshold may be determined by testing the host vehicle 10. If the distance $D_i$ from the first trajectory statistic to the second trajectory statistic is less than the predetermined threshold, then the method 200 proceeds to block 226. At block 226, the system controller 34 sets the attention score of the actor removed at block 218 (i.e., the removed actor) to zero. After block 226, the method 200 returns to block 216. If the distance $D_i$ from the first trajectory statistic to the second trajectory statistic is not less than the predetermined threshold, the method 200 continues to block 228. At block 228, the system controller 34 sets the attention score of the actor 50 removed at block 218 to a value between zero and one. In this case, the value of the attention score of the removed actor 50 is proportional to the distance $D_i$ from the first trajectory statistic to the second trajectory statistic. After block 228, the method 200 returns to block 216. Blocks 218, 220, 222, 226, and 228 may be executed in parallel for different removed actors 50.

Once the attention scores of actors 50 are determined either at block 226 or block 228, the system controller 34 commands the host vehicle 10 to autonomously drive according to a trajectory determined by taking into account the attention scores, which may be determined as discussed above with respect to FIG. 4. With respect to the perception algorithm, the attention scores may be used in connection with zooming and cropping image, zooming and tilting camera, updating sensing rates based on attention score, disabling and/or enabling sensors 40, adjusting the update rate on specific modules such as traffic light detections in higher rates when it matters. With respect to the localization algorithm, the attention scores may be used in connection with considering (e.g., ignoring) for scene fusion relating to lanes and considering (e.g., ignoring) actors 50 for lane assignment. With respect to the prediction algorithm, the attention scores may be used in connection with considering (e.g., ignoring) actors 50 in the driving scene 70 and determining the prediction maximum distance (i.e., prediction horizon).

FIG. 7 is a flowchart of a method 300 for generating region priority scores. The method 300 begins at block 302. Then, the method 300 continues to block 304. At block 304, the system controller 34 receives input data. The input data includes lane information, the pose of the host vehicle 10, the previous trajectory of the host vehicle 10, and the attention scores of the actors 50 determined in the method 100. Then, the method 300 continues to block 306.

At block 306, the system controller 34 finds regions in front and rear of the host vehicle 10 within some horizon. In other words, the system controller 34 identifies regions in the driving scene 70 in front and in the rear of the host vehicle 10 within a predetermined distance from the host vehicle 10. In the present disclosure, the term "region" means a combination of connected or adjacent lane segments around host vehicle 10 following the route plan to destination. Then, the method 300 continues to block 308.

At block 308, the system controller 34 finds a predetermined target region from the previous trajectory. The predetermined target region is the region in the driving scene 70 that the host vehicle 10 will move into based on the previous trajectory. Then, the method 300 proceeds to block 310.

At block 310, the system controller 34 assigns a priority score of 1.0 to the predetermined target region and the current region. In the present disclosure, the term "current region" means the region in front of the host vehicle 10, following the route plan, which includes the lane segment in which the host vehicle 10 is located. Then, the method 300 continues to block 312.

At block 312, the system controller 34 determines whether there are any unprocessed regions. In other words, the system controller 34 determines whether any regions have not processed with the actions described in blocks 314, 316, and 318. If there are no unprocessed regions, then the method 300 returns to block 304. If there are one or more unprocessed regions, then the method 300 selects an unprocessed region and proceeds to block 314.

At block 314, the system controller 34 determines whether there are any actors 50 in the selected region using the input data. If there are no actors 50 in the selected region, then the method 300 continues to block 316. At block 316, the system controller 34 assigns the selected region a priority score of zero. Then, the method 300 returns to block 312.

If there are actors 50 in the selected region, then the method 300 proceeds to block 318. At block 318, the system controller 34 assigns the selected region a priority score that is equal to the greatest attention score of all the attention scores of the actors 50 in the selected region. The, the method 300 returns to block 312. Once the priority scores of the regions are determined either at block 316 or block 318, the system controller 34 commands the host vehicle 10 to autonomously drive according to a trajectory determined by taking into account the priority scores determined either at block 316 and/or block 318.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for generating planning-based attention signals, comprising:
receiving driving-scene data, wherein the driving-scene data is indicative of a driving scene around a host vehicle, and the driving-scene data includes map data and localization data, and the driving scene includes a plurality of actors;
converting the driving-scene data into a scene-graph;
inputting the scene-graph into a deep neural network (DNN);
determining an attention score for each of the plurality of actors using the DNN and the scene-graph, wherein the attention score of each of the plurality of actors represents a priority given to each of the plurality of actors in the driving scene, wherein the plurality of actors includes a removed actor and a plurality of remaining actors; and
commanding the host vehicle to autonomously drive according to a trajectory determined by taking into account the attention score of each of the plurality of actors;
creating a plurality of first scenarios by generating a plurality of first samples from an uncertainty distribution of a state of the plurality of actors;
creating a plurality of second scenarios by generating a plurality of second samples from an uncertainty distribution of a state of the plurality of remaining actors;
generating a first sample trajectory for each of the plurality of first scenarios;
generating a second sample trajectory for each of the plurality of second scenarios;
determining a first trajectory statistic using the first sample trajectory for each of the plurality of first scenarios;
determining a second trajectory statistic using the second sample trajectory for each of the plurality of second scenarios;
determining a distance from the first trajectory statistic to the second trajectory statistic; and
wherein the first trajectory statistic is a first average trajectory, the second trajectory statistic is a second average trajectory, and the distance from the first trajectory statistic to the second trajectory statistic is determined using a following equation:

$$D_i = \max_t \left[ (x_i(t) - x_o(t))^2 + (y_i(t) - y_o(t))^2 \right]$$

where:
t is time;
$(x_o(t), y_o(t))$ are waypoints at time t of the first average trajectory;
$(x_i(t), y_i(t))$ are waypoints at time t of second average trajectory; and
$D_i$ is distance from the first average trajectory to the second average trajectory.

2. The method of claim 1, wherein one of the plurality of actors is a lead remote-vehicle, and the method further comprising:
determining that the attention score of the lead remote-vehicle is zero; and
determining a time-to-collision (TTC) of the lead remote-vehicle to the host vehicle; and
adding a predetermined value to the attention score of the lead remote-vehicle, wherein the predetermined value is proportional to the TTC.

3. The method of claim 1, wherein the plurality of actors includes a plurality of irrelevant actors, the plurality of irrelevant actors is undetected by a plurality of sensors of the host vehicle in real-world or cannot affect an autonomous driving plan for the host vehicle, and the method further comprises filtering out the plurality of irrelevant actors before determining the attention score for each of the plurality of actors.

4. The method of claim 3, further comprising removing an actor of the plurality of actors from a driving scene, wherein the actor of the plurality of actors that was removed from the driving scene is the removed actor, the plurality of actors includes the removed actor and the plurality of remaining actors.

5. The method of claim 4, further comprising:
determining whether the distance from the first trajectory statistic to the second trajectory statistic is less than a predetermined threshold; and
setting the attention score of the removed actor to zero in response to determining that the distance from the first trajectory statistic to the second trajectory statistic is less than the predetermined threshold.

6. The method of claim 4, further comprising:
determining whether the distance from the first trajectory statistic to the second trajectory statistic is less than a predetermined threshold; and
setting the attention score of the removed actor to a value between zero and one in response to determining that the distance from the first trajectory statistic to the second trajectory statistic is not less than the predetermined threshold, wherein the attention score of the removed actor is proportional to the distance from the first trajectory statistic to the second trajectory statistic.

7. The method of claim 1, further comprising assigning a plurality of priority scores for each of a plurality of regions around the host vehicle using the attention score of each of the plurality of actors.

8. A tangible, non-transitory, machine-readable medium, comprising machine-readable instructions, that when executed by a processor, cause the processor to:
receive driving-scene data, wherein the driving-scene data is indicative of a driving scene around a host vehicle, and the driving-scene data includes map data and localization data, and the driving scene includes a plurality of actors;
convert the driving-scene data into a scene-graph;
input the scene-graph into a deep neural network (DNN);
determine an attention score for each of the plurality of actors using the DNN, wherein the attention score of each of the plurality of actors represents a priority given to each of the plurality of actors based on the driving scene; and
command the host vehicle to autonomously drive according to a trajectory determined taking into account the attention score of each of the plurality of actors, wherein the plurality of actors includes a removed actor and a plurality of remaining actors;
creating a plurality of first scenarios by generating a plurality of first samples from an uncertainty distribution of a state of the plurality of actors;
creating a plurality of second scenarios by generating a plurality of second samples from an uncertainty distribution of a state of the plurality of remaining actors;
generating a first sample trajectory for each of the plurality of first scenarios;
generating a second sample trajectory for each of the plurality of second scenarios;
determining a first trajectory statistic using the first sample trajectory for each of the plurality of first scenarios;
determining a second trajectory statistic using the second sample trajectory for each of the plurality of second scenarios;
determining a distance from the first trajectory statistic to the second trajectory statistic; and
wherein the first trajectory statistic is a first average trajectory, the second trajectory statistic is a second average trajectory, and the distance from the first trajectory statistic to the second trajectory statistic is determined using a following equation:

$$D_i = \max_t \left[ (x_i(t) - x_o(t))^2 + (y_i(t) - y_0(t))^2 \right]$$

where:
t is time;
($x_o$(t),$y_o$(t)) are waypoints at time t of the first average trajectory;
($x_i$(t),$y_i$(t)) are waypoints at time t of second average trajectory; and
$D_i$ is distance from the first average trajectory to the second average trajectory.

9. The tangible, non-transitory, machine-readable medium of claim 8, wherein one of the plurality of actors is a lead remote-vehicle, and the tangible, non-transitory, machine-readable medium, comprising machine-readable instructions, that when executed by the processor, causes the processor to:
determine that the attention score of the lead remote-vehicle is zero;
determine a time-to-collision (TTC) of the lead remote-vehicle to the host vehicle; and
add a predetermined value to the attention score of the lead remote-vehicle, wherein the predetermined value is proportional to the TTC.

10. The tangible, non-transitory, machine-readable medium of claim 9, wherein the plurality of actors includes a plurality of irrelevant actors, the plurality of irrelevant actors is undetected by a plurality of sensors of the host vehicle, and the tangible, non-transitory, machine-readable medium, comprises machine-readable instructions, that when executed by the processor, causes the processor to:
filter out the plurality of irrelevant actors before determining the attention score of each of the plurality of actors.

11. The tangible, non-transitory, machine-readable medium of claim 10, further comprising machine-readable instructions, that when executed by the processor, cause the processor to:
remove an actor of the plurality of actors from a driving scene, wherein the actor of the plurality of actors that was removed from the driving scene is the removed actor, the plurality of actors includes the removed actor and the plurality of remaining actors.

* * * * *